June 1, 1965  O. SÜS ETAL  3,186,845
TWO-COMPONENT DIAZOTYPE MATERIAL
Filed Nov. 8, 1962
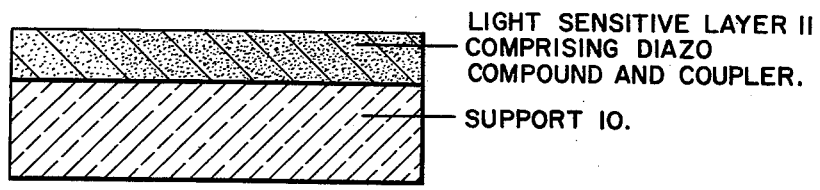
LIGHT SENSITIVE LAYER II COMPRISING DIAZO COMPOUND AND COUPLER.
SUPPORT 10.
INVENTOR.
OSKAR SÜS
GOTTLIEB von POSER
BY  GEORG WERNER
J. Russell Juten
ATTORNEY

United States Patent Office 3,186,845
Patented June 1, 1965

3,186,845
TWO-COMPONENT DIAZOTYPE MATERIAL
Oskar Süs, Wiesbaden-Biebrich, Gottlieb von Poser, Wiesbaden, and Georg Werner, Wiesbaden-Biebrich, Germany, assignors, by mesne assignments, to Keuffel & Esser Co., Hoboken, N.J.
Filed Nov. 8, 1962, Ser. No. 236,191
Claims priority, application Germany, Nov. 11, 1961,
K 45,186
6 Claims. (Cl. 96—91)

This invention relates to photoprinting materials and refers more particularly to two-component diazotype photoprinting materials and to the diazo compounds and couplers used therein.

Amides of 3,5-dihydroxybenzoic acid, also known as α-resorcylic acid, have been disclosed for use as azo components in the diazotype process and have found industrial application even for the preparation of two-component diazotype layers. The good keeping qualities of the light-sensitive material prepared therewith are of particular interest for tropical countries.

By the introduction of a bromine atom into the benzene ring of the 3,5-dihydroxybenzoic acid as substituent, the contrast in the prints was intensified and the shade of color deepened. For example, by the use of 3,5-dihydroxy-4-bromobenzoic acid amide as coupler together with a substituted p-amino-benzene diazo compound having a tertiary nitrogen atom, full bluish red shades were obtained while the bromine-free 3,5-dihydroxybenzoic acid amide gave brown shades. Further, with the introduction of the bromine atom, the water-solubility of the amide, in comparison with the water-solubility of the bromine-free amide, was increased. This lessened the chance of crystallization occurring during the coating process, since the brominated amide had better solubility in the sensitizing solution.

Among the compounds discussed in this specification are the following designated herein as Formulas I to XI:

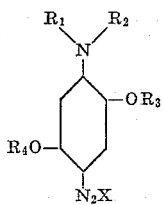

Formula I

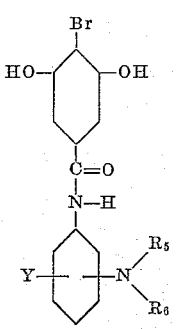

Formula II

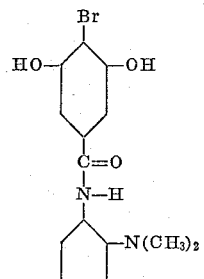

Formula III

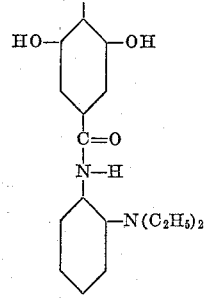

Formula IV

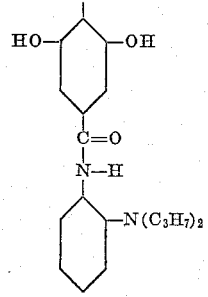

Formula V

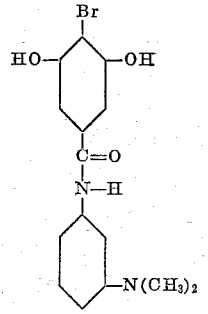

Formula VI

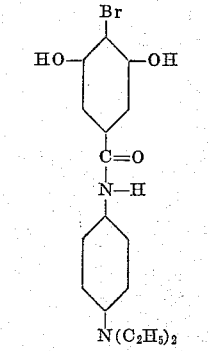

Formula VII

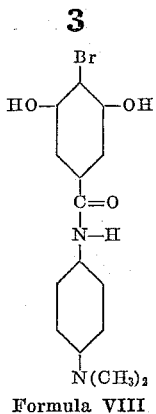

Formula VIII

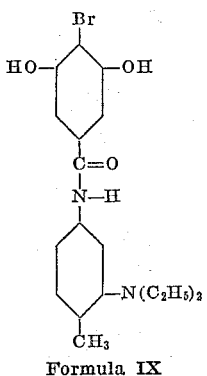

Formula IX

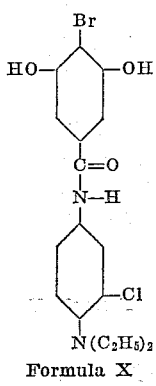

Formula X

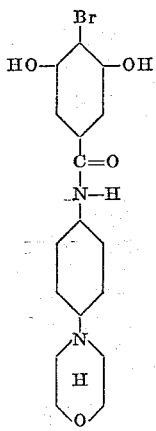

Formula XI

It was found that the favorable properties of the brominated resorcylic acid amides were particularly in evidence when these couplers were used in combination with substituted p-amino-benzene diazo compounds having a tertiary nitrogen atom and two alkoxy groups in para position to each other on the benzene nucleus. The general formula for such diazo compounds is Formula I in which $R_1$ stands for alkyl with 1 to 4 carbon atoms or for aralkyl, $R_2$ for alkyl with 1 to 4 carbon atoms, $R_3$ and $R_4$ for similar or different alkyl radicals with 1 to 5 carbon atoms, X for an acid radical, and $R_1$ and $R_2$ may also be members of one and the same heterocyclic ring which may carry one or more substituents.

The known diazo compounds corresponding to this formula are very light sensitive.

Unfortunately, the copies obtained by the use of diazotype paper having a light sensitive coating containing a 3,5-dihydroxy-4-bromo-benzoic acid amide and a diazo compound of Formula I had poor water-resistance. The dyestuffs bled when the copies were moistened with water or when water colors were applied to them. An improvement in water-resistance was obtained when a hydrogen atom in the carboxylic acid amide group of the bromodihydroxy benzoic acid amide was replaced by an aryl radical, e.g. the phenyl radical. These compounds have, however, extremely poor solubility and are for practical purposes useless in diazotype processes.

It has now been found that diazotype photoprinting papers which contain, as diazo component in the light sensitive coating, compounds with the Formula I given above and, as a coupling component, salts of 4-bromo-3,5-dihydroxy benzoic acid anilides corresponding to Formula II in which $R_5$ and $R_6$ stand for alkyl with 1 to 3 carbon atoms or are members of one and the same heterocyclic five-membered or six-membered ring which may carry one or more substituents, and Y is a member selected from the group consisting of hydrogen, alkyl, and halide radicals, give particularly outstanding prints.

The compounds formed by the introduction of a tertiary alkylamino group into the phenyl portion of the carboxamide group have very good water-solubility if used in the form of their salts. They are also in the form of their water-soluble salts if applied together with the diazo compound in aqueous solution containing acid additives.

Despite the good water-solubility of these coupling components present in the form of salts, the dyestuffs produced on the print after development with gaseous ammonia had excellent water-resistance. Thus a technical advance was achieved—a quality improvement for a highly light sensitive photoprinting paper which was gaining increasing importance.

It is remarkable that by alteration of the alkyl radicals in the basic substituent of the benzene ring of the carboxamide group, the color shade can be influenced.

According to the present invention, the group —$NR_1R_2$ in Formula I or the group —$NR_5R_6$ in Formula II, or both these groups, may stand for heterocyclic groups which may carry one or more substituents, e.g. one or more alkyl groups. Suitable groups are the pyrrolidone group, the piperazine group, the morpholine group, the 2-methyl-morpholine group, the 2-ethyl-morpholine group, the 2,3-, the 2,5-, the 2,6-, and the 3,5-dimethyl-morpholine groups, the 2,6-diethyl-morpholine group, the 3,5- and the 5,2-methyl-ethyl-morpholine groups, the 2,3,5-trimethyl-morpholine group, and the thio-morpholine group.

One object of the present invention is to provide a two-component diazotype photoprinting material which does not have the disadvantages of the prior art.

Another object is to provide a two-component diazotype photoprinting material which has a developed image with improved color intensity, improved color shades, and which is resistant to bleeding or leaching due to application of water and water colors.

Another object is to provide a coupler for two-component diazotype photoprinting materials.

Other objects will become apparent during the course of the specification.

The drawing shows a sectional view of a diazotype photoprinting material of the present invention.

The basic aryl amides of the brominated 3,5-dihydroxy benzoic acid corresponding to the general Formula II given above which figure in the invention have not been described in the literature. They were obtained by the following methods:

(1) 3,5-dihydroxy-4-bromo-benzoic acid—described by Barth and Senhofer in Liebig's Annalen, vol. 164 (1872), p. 115—was acetylated in the hydroxyl groups and the resultant diester was converted into the carboxylic acid chloride by reaction with ionyl chloride. The carboxylic acid chloride was dissolved in an inert organic solvent, e.g., dioxane, and then reacted with an amino-(dialkylamino)-benzene. By subsequent saponification with dilute hydrochloric acid the acetylated hydroxyl groups were set free again.

(2) The 3,5-dihydroxy-4-bromo benzoic acid was condensed in an inert solvent in the presence of a phosphorus chloride with an amino-(dialkylamino)-benzene.

The preparation of the diazo compounds corresponding to the said general Formula I which were used as the light-sensitive component was readily effected by methods described in the literature or by similar methods.

The examples given herein are given for purposes of illustration, and it is to be understood that the invention is not limited to these examples.

*Example 1*

Diazotype base paper support with a precoat of colloidal silicic acid was coated with a solution containing 2.0 g. of 1-[(2′-dimethylamino)-carbanilido]-3,5-dihydroxy-4-bromo-benzene corresponding to Formula III
2.0 g. of the diazo compound from 1-morpholino-2,5-dimethoxy-4-amino-benzene (in the form of the zinc chloride double salt)
4.0 g. of citric acid
3.0 g. of boric acid
4.0 g. of thiourea in 100 cc. of water.

After drying, the sensitized base paper was exposed to light under a transparent pencil drawing and afterwards developed with ammonia. High-contrast copies with bluish-red color and pure white background were obtained. When the copies were dabbed with water the dyestuff did not run, while the dyestuff obtained by the use of the simple amide of the 3,5-dihydroxy-4-bromobenzoic acid bled out completely.

Instead of the said diazo compound, the diazotization product from 1-piperidino-2,5-dimethoxy-4-amino-benzene can be used in combination with the compound of Formula III with equal success.

The compound corresponding to Formula III was prepared as follows:

42 g. (1.8 mol) of 3,5-dihydroxy-4-bromo benzoic acid, which is described by Bart and Senhofer in Liebig's Annalen, vol. 164 (1872), p. 115, was suspended in 80 cc. (4.2 mol) of acetic acid. When 0.1 cc. of pure sulphuric acid was added, the reaction mixture went into solution with heating; it was further heated for half an hour to boiling. For the isolation of the acetyl compound, the hot mixture was poured with vigorous stirring, upon about 200 g. of ice. The oil which then appeared was further stirred for some time and then solidified in crystalline form. It was filtered off with suction, washed with water, and dried. The melting point was 176–178° C. When the diacetyl compound was heated with thionyl chloride, e.g., 36.8 g. of diacetyl product with 75 cc. of thionyl chloride, for 2 to 2½ hours, the chloride of acetylated 3,5-dihydroxy-4-bromobenzoic acid (diacetyl-bromo resorcylic acid chloride) was formed, this was isolated by vacuum distillation of the residual thionyl chloride. After purification with petroleum ether, the melting point was 108° C.

When an equimolecular quantity of 2-dimethylamino-aniline was added dropwise, with stirring, to a solution of the diacetyl bromo-resorcylic acid chloride in dioxane at moderately increased temperature, e.g., at 25–30° C., the resultant condensation product, 1 - [(2′ - dimethylamino) - carbanilido] - 3,5 - diacetoxy - 4 - bromo - benzene, crystallized out in the form of the hydrochloride.

For the saponification of the two acetoxy groups, the reaction mixture was heated for 15–20 minutes on the steam bath to 70–80° C. after 150 cc. of hydrochloric acid (about 18%) had been added. The resultant solution was filtered over charcoal and, after cooling, the filtrate was neutralized with about 20% sodium hydroxide. The resultant crystal slurry was the 1-[(2′-dimethylamino) - carbanilido] - 3,5 - dihydroxy - 4 - bromo - benzene (Formula III). The crystals were filtered off with suction, washed with water, and further purified by recrystallization from the smallest possible quantity of methanol. The purified product was colorless and melted at 222° C.

*Example 2*

The procedure of Example 1 was followed but instead of the compound corresponding to Formula III the equivalent quantity of the compound 1-[(2′-diethylamino) - carbanilido] - 3,5 - dihydroxy - 4 - bromo - benzene corresponding to Formula IV is used in the coating solution as coupler. From the photoprinting paper prepared therewith prints with violet red color were obtained. The dyestuff was water-resistant. In comparison with commercially available photoprinting papers from which copies with red colors can be prepared, the paper prepared in accordance with this invention was characterized by considerably improved contrast.

Instead of the compound corresponding to Formula IV, the 1 - [(2′ - dipropylamino) - carbanilido] - 3,5-dihydroxy-4-bromobenzene corresponding to Formula V or the 1 - [(3′ - dimethylamino) - carbanilido] - 3,5-dihydroxy-4-bromo-benzene corresponding to Formula VI can be used with equally good results with a slight color displacement to the red-violet in the lines of the prints.

The compound corresponding to Formula IV, can be prepared in analogous manner to that described in Example 1 for the compound with Formula III or it can be prepared as follows:

90 g. (0.39 mol) of 3,5-dihydroxy-4-bromo-benzoic acid and 57.4 g. (0.35 mol) of 2-diethylamino-aniline are suspended in 700 cc. of xylene and heated to boiling in conditions from which moisture is excluded. Then 17.6 cc. (0.2 mol) of phosphorus trichloride mixed with 50 cc. of xylene are slowly introduced dropwise into the boiling mixture, with good stirring, and the boiling reaction mixture is stirred for two hours. During this time the reaction product precipitates out and, after the xylene has been separated off, 250 cc. of formic acid are added and heat is applied until solution takes place. This solution is poured into water, twice filtered over charcoal, cooled with ice and neutralized with sodium hydroxide solution. The 1-[(2′-diethylamino)-carbanilido] - 3,5 - dihydroxy - 4 - bromo - benzene separates out as free base in the form of a finely divided white precipitate which is filtered off with suction, washed with water and dried. It is then purified by solution in hydrochloric acid and reprecipitation with sodium hydroxide solution. The compound corresponding to Formula IV melts at 218–224° C.

The compound corresponding to Formula V with a melting point of 236–237° C. and that corresponding to Formula VI with a melting point of 243–246° C. were prepared analogously to the compounds corresponding to Formula III and Formula IV.

*Example 3*

In the same manner as in Example 1, paper was coated with a solution containing 2.0 g. of 1-[(2'-dimethylamino)-carbanilido]-3,5-dihydroxy-4-bromo-benzene corresponding to Formula III
2.4 g. of the diazo compound from 1-dimethylamino-2,5-diethoxy-4-amino-benzene (in the form of the zinc chloride double salt)
6.0 g. of citric acid
5.0 g. of thiourea to each 100 cc. of water. With the paper thus sensitized prints with a bluish red color were obtained. The dyestuff was highly water-resistant.

Instead of the diazo compound from 1-dimethylamino-2,5-diethoxy-4-amino-benzene, the diazo compound from 1-diethylamino-2,5-diethoxy-4-amino-benzene or from 1-diethylamino-2,5-dimethoxy-4-amino-benzene, in the form of the zinc chloride double salts, can be used with equally good results.

*Example 4*

In accordance with the instructions given in Example 1, diazotype base paper was coated with a solution which contained 2 g. of 1-[(4'-diethylamino)-carbanilido]-3,5-dihydroxy-4-bromo-benzene corresponding to Formula VII or 2 g. of 1-[(4'-dimethylamino)-carbanilido]-3,5-dihydroxy-4-bromo-benzene corresponding to Formula VIII and 2.3 g. of the diazo compound from 1-(N-methyl-piperazino)-2,5-diethoxy-4-amino-benzene (in the form of the zinc chloride double salt). Compounds corresponding to Formulas VII and VIII were prepared analogously to the compounds corresponding to Formulas III and IV.

With the sensitized paper, prints with violet red color were obtained. The color obtained with the compound corresponding to Formula VIII appeared somewhat more bluish. When water colors were applied to the prints no running of the lines was observed.

*Example 5*

In accordance with the instructions given in Example 1 and with the additives therein mentioned a solution was prepared which contained 2.1 g. of 1-[(3'-diethylamino-4'-methyl)-carbanilido]-3,5-dihydroxy-4-bromo-benzene corresponding to Formula IX and 2.2 g. of the diazo compound from 1-morpholino-2,5-dibutoxy-4-amino-benzene (in the form of the zinc chloride double salt) and was coated upon diazotype base paper. When the sensitized paper was exposed to light under a transparent master and developed, prints were obtained with deep brown-red lines. The compound corresponding to Formula IX was prepared analogously to the compounds corresponding to Formulas III and IV.

If the diazo compound from 1-morpholino-2,5-dipropoxy-4-amino-benzene were used instead of said di-butoxy compound, prints are obtained which do not differ essentially in color from those obtained with the di-butoxy compound.

*Example 6*

In accordance with the instructions given in Example 1 and with the additives therein mentioned, a sensitizing solution was prepared with 2.2 g. of 1-[(4'-diethylamino-3'-chloro)-carbanilido]-3,5-dihydroxy-4-bromo-benzene corresponding to Formula X and 2.2 g. of the diazo compound from 1-(N-benzyl-N-methyl-amino)-2,5-diethoxy-4-amino-benzene (in the form of the zinc chloride double salt). This was applied to diazotype base paper and dried. The copies obtained by exposure to light under a master and development were of a more bluish red than the prints obtained in the previous examples. The compound corresponding to Formula X was prepared analogously to the compounds corresponding to Formulas III and IV.

*Example 7*

For the preparation of a solution for the sensitization of diazotype base paper the procedure described in Example 1 was followed but 1.9 g. of 1-[(4'-morpholino)-carbanilido]-3,5-dihydroxy-4-bromo-benzene corresponding to Formula XI were used as coupling component and 1.9 g. of the diazo compound from 1-pyrrolidino-2,5-diethoxy-4-amino-benzene (in the form of the zinc chloride double salt). The compound corresponding to Formula XI was prepared analogously to the compounds corresponding to Formulas III and IV.

With the sensitized paper, copies were prepared in the usual way. After development, prints with red-violet lines were obtained.

It is apparent that the described examples are capable of many variations and modifications within the scope of the present invention. All such variations are to be included within the scope of the present invention.

What is claimed is:

1. A two-component diazotype photoprinting material, comprising a support, and a light sensitive layer coated on said support, said light sensitive layer comprising a diazo compound and a coupler, said diazo compound having the formula

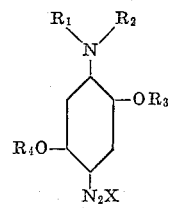

where $R_1$ and $R_2$ are selected from one of the following two groups A and B:
  group A wherein $R_1$ is selected from a group consisting of 1, 2, 3, and 4-carbon alkyls, and aralkyl, and wherein $R_2$ is a member of a group consisting of 1, 2, 3, and 4-carbon alkyls; and
  group B wherein $R_1$ and $R_2$ are members of a common heterocyclic ring selected from a group consisting of five-membered and six-membered heterocyclic rings;
where $R_3$ and $R_4$ are selected from a group consisting of 1, 2, 3, 4, and 5-carbon alkyls, and
where X is an acid radical,
and said coupler having the formula

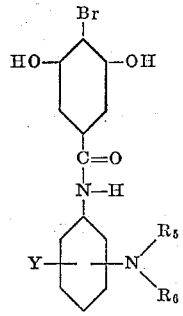

where $R_5$ and $R_6$ are selected from one of the following two groups C and D:
  group C wherein $R_5$ and $R_6$ are selected from a group consisting of 1, 2, and 3-carbon alkyls; and
  group D wherein $R_5$ and $R_6$ are members of a common heterocyclic ring selected from a group consisting of five-membered and six-membered heterocyclic rings,
and where Y is a member selected from the group consisting of hydrogen, alkyl, and halide radicals.

2. A two-component diazotype photoprinting material, comprising a support and a light sensitive layer coated on said support, said light sensitive layer comprising a diazo compound and a coupler, said diazo compound being 4-morpholino-2,5-dimethoxy-benzene diazonium chloride, and said coupler being 1-[(2'-dimethylamino)-carbanilido]-3,5-dihydroxy-4-bromo-benzene.

3. A two-component diazotype photoprinting material, comprising a support and a light sensitive layer coated on said support, said light sensitive layer comprising a diazo compound and a coupler, said diazo compound being 4-morpholino-2,5-dimethoxy-benzene diazonium chloride, and said coupler being 1-[(3'-dimethylamino)-carbanilido]-3,5-dihydroxy-4-bromo-benzene.

4. A two-component diazotype photoprinting material, comprising a support and a light sensitive layer coated on said support, said light sensitive layer comprising a diazo compound and a coupler, said diazo compound being 4-(N-methyl-piperazino)-2,5-diethoxy-benzene diazonium chloride, and said coupler being 1-[(4'-dimethylamino)-carbanilido]-3,5-dihydroxy-4-bromo-benzene.

5. A two-component diazotype photoprinting material, comprising a support and a light sensitive layer coated on said support, said light sensitive layer comprising a diazo compound and a coupler, said diazo compound being 4-(N-benzyl-N-methyl-amino)-2,5-diethoxy-benzene diazonium chloride, and said coupler being 1-[(4'-diethylamino-3'-chloro)-carbanilido]-3,5-dihydroxy-4-bromo-benzene.

6. A two-component diazotype photoprinting material, comprising a support and a light sensitive layer coated on said support, said light sensitive layer comprising a diazo compound and a coupler, said diazo compound being 4-pyrrolidino-2,5-diethoxy-benzene diazonium chloride, and said coupler being 1-[(4'-morpholino)-carbanilido]-3,5-dihydroxy-4-bromo-benzene.

References Cited by the Examiner
UNITED STATES PATENTS

| | | | |
|---|---|---|---|
| 2,467,358 | 4/49 | Neumann | 96—91 X |
| 2,650,925 | 9/53 | Ouperoff-Urne | 260—268 |
| 2,819,305 | 1/58 | Lott | 260—559 |
| 2,940,852 | 6/60 | Herrick et al. | 96—91 |
| 2,970,909 | 2/61 | Slimowicz | 96—91 |
| 3,064,049 | 11/62 | Cox | 260—560 |
| 3,072,573 | 1/63 | Spacht | 260—559 |

NORMAN G. TORCHIN, *Primary Examiner.*